US012613894B2

(12) United States Patent
Yoshida et al.

(10) Patent No.: US 12,613,894 B2
(45) Date of Patent: Apr. 28, 2026

(54) INFORMATION PROCESSING APPARATUS, COMPUTER PROGRAM PRODUCT, AND INFORMATION PROCESSING METHOD

(71) Applicant: KABUSHIKI KAISHA TOSHIBA, Tokyo (JP)

(72) Inventors: Takami Yoshida, Kamakura Kanagawa (JP); Kenji Iwata, Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 0 days.

(21) Appl. No.: 19/001,277

(22) Filed: Dec. 24, 2024

(65) Prior Publication Data

US 2025/0238450 A1     Jul. 24, 2025

(30) Foreign Application Priority Data

Jan. 19, 2024    (JP) ................................ 2024-006971

(51) Int. Cl.
*G06F 16/334*        (2025.01)
*G06F 40/40*         (2020.01)

(52) U.S. Cl.
CPC .......... *G06F 16/3344* (2019.01); *G06F 40/40* (2020.01)

(58) Field of Classification Search
CPC .................................................. G06F 16/3344
See application file for complete search history.

(56) References Cited

U.S. PATENT DOCUMENTS

| | | | |
|---|---|---|---|
| 2016/0034565 A1* | 2/2016 | Bastide | .................. H04L 67/02 |
| | | | 707/749 |
| 2024/0095491 A1 | 3/2024 | Birru et al. | |
| 2025/0094465 A1* | 3/2025 | Xu | ........................ G06F 16/383 |

FOREIGN PATENT DOCUMENTS

JP          3946115 B2      7/2007

* cited by examiner

*Primary Examiner* — Van H Oberly
(74) *Attorney, Agent, or Firm* — Holtz, Holtz & Volek PC

(57) ABSTRACT

An information processing apparatus includes one or more hardware processors. The processors retrieve one or more texts matching a search query from a text group as a search target. The processors generate one or more candidates for a generation operation for a response to the search query using the search query and the retrieved texts. The processors determine, for each candidate, whether there is excess or deficiency in information included in a first response generated according to the candidate. The processors decide one of the candidates as the operation for generating the response based on a determination result. The processors generate a second response according to the decided operation.

13 Claims, 7 Drawing Sheets

START

⟋S101
RECEIVE INPUT TEXT

⟋S102
EXTRACT FEATURE AMOUNT FROM INPUT TEXT

⟋S103
RETRIEVE TEXT USING FEATURE AMOUNT

⟋S104
GENERATE OPERATION CANDIDATES USING RETRIEVED TEXT

⟋S105
DETERMINE WHETHER THERE IS EXCESS OR DEFICIENCY IN INFORMATION TO BE PROVIDED FOR EACH OPERATION CANDIDATE

⟋S106
DECIDE OPERATION TO BE ADOPTED USING DETERMINATION RESULT

⟋S107
GENERATE RESPONSE ACCORDING TO DECIDED OPERATION

⟋S108
OUTPUT RESPONSE

END

FIG.6

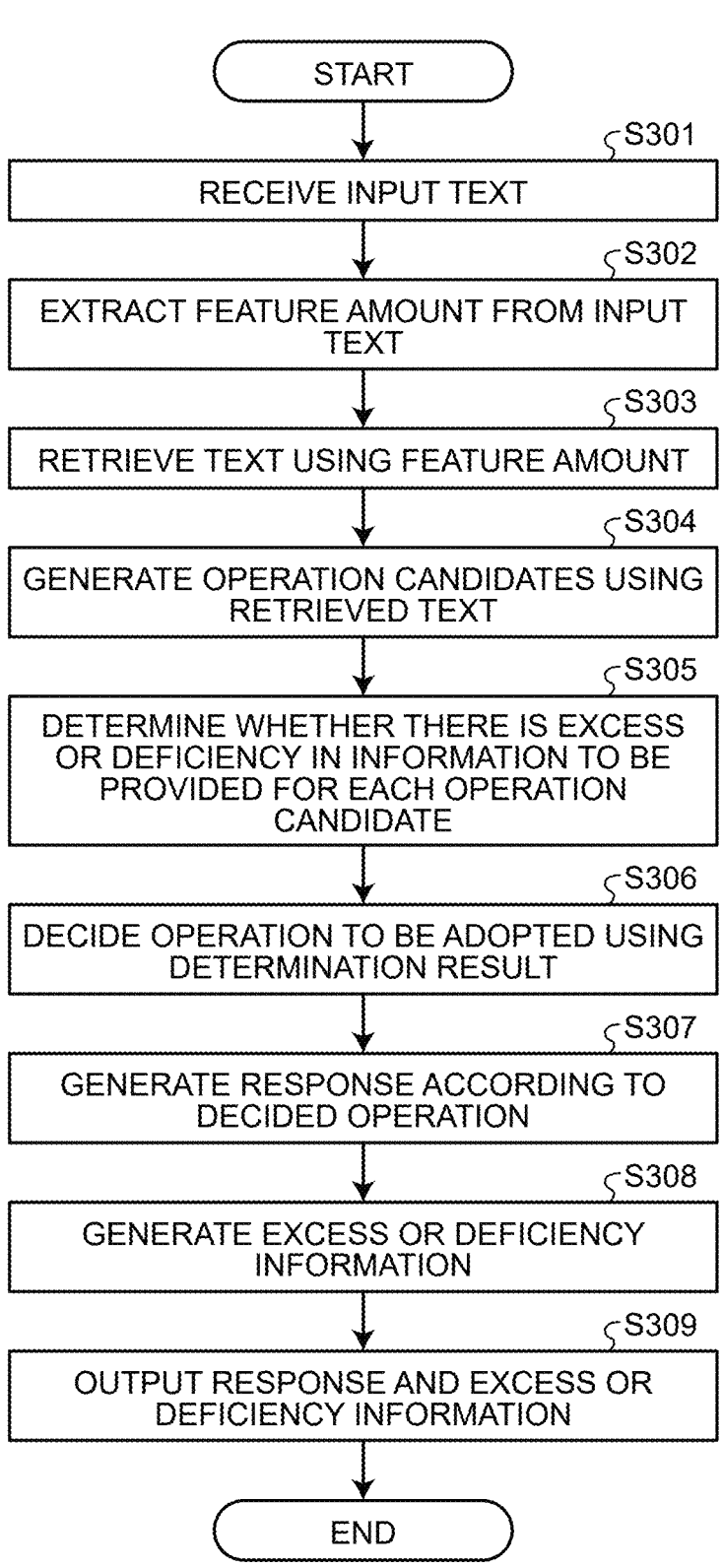

START

S301
RECEIVE INPUT TEXT

S302
EXTRACT FEATURE AMOUNT FROM INPUT TEXT

S303
RETRIEVE TEXT USING FEATURE AMOUNT

S304
GENERATE OPERATION CANDIDATES USING RETRIEVED TEXT

S305
DETERMINE WHETHER THERE IS EXCESS OR DEFICIENCY IN INFORMATION TO BE PROVIDED FOR EACH OPERATION CANDIDATE

S306
DECIDE OPERATION TO BE ADOPTED USING DETERMINATION RESULT

S307
GENERATE RESPONSE ACCORDING TO DECIDED OPERATION

S308
GENERATE EXCESS OR DEFICIENCY INFORMATION

S309
OUTPUT RESPONSE AND EXCESS OR DEFICIENCY INFORMATION

END

FIG.7

INFORMATION PROCESSING APPARATUS, COMPUTER PROGRAM PRODUCT, AND INFORMATION PROCESSING METHOD

CROSS-REFERENCE TO RELATED APPLICATIONS

This application is based upon and claims the benefit of priority from Japanese Patent Application No. 2024-006971, filed on Jan. 19, 2024; the entire contents of which are incorporated herein by reference.

FIELD

Embodiments described herein relate generally to an information processing apparatus, a computer program product, and an information processing method.

BACKGROUND

A dialogue system that receives an input sentence by a user, retrieves information related to the input sentence, and responds based on a search result is utilized in many scenes. If a large number of pieces of related information are retrieved due to a deficient point or an ambiguous point that is present in the input sentence by the user, the dialogue system asks a question back for prompting the user to input additional information and receives an additional input sentence by the user. By performing a search through multiple such exchanges, the dialogue system is capable of retrieving desired information even for a complicated request and an ambiguous request.

BRIEF DESCRIPTION OF THE DRAWINGS

FIG. 6 is a flowchart of a response generation process according to the second modification; and FIG. 7 is a hardware configuration diagram of the information processing apparatus according to the embodiment.

DETAILED DESCRIPTION

Figure 1:
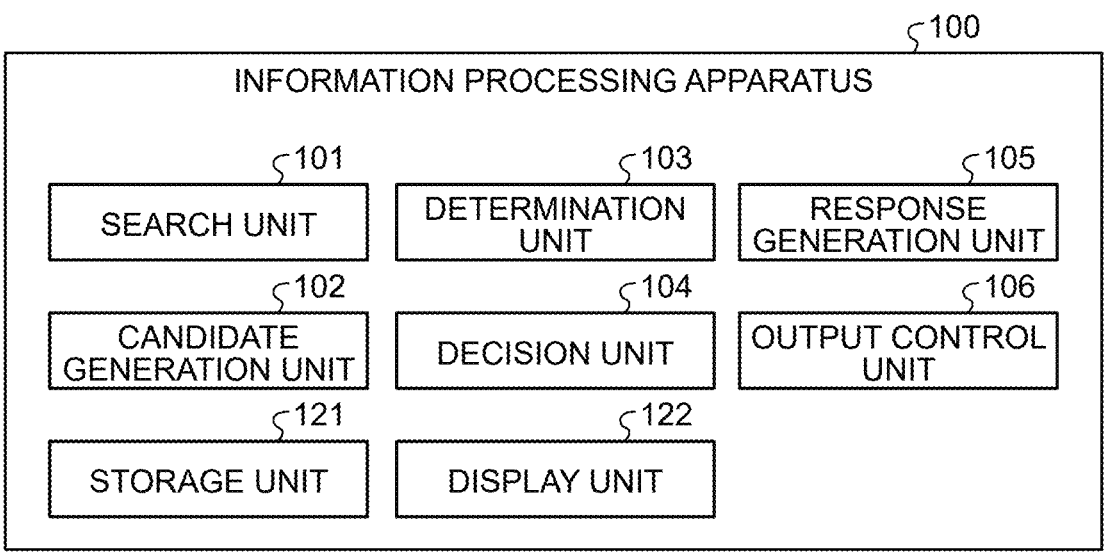
FIG. 1 is a block diagram of an information processing apparatus according to an embodiment.

An object of the present disclosure is to provide an information processing apparatus, a computer program product, and an information processing method capable of more efficiently searching for information.

An information processing apparatus includes one or more hardware processors. The processors retrieve one or more texts matching a search query from a text group as a search target. The processors generate one or more candidates for a generation operation for a response to the search query using the search query and the retrieved texts. The processors determine, for each candidate, whether there is excess or deficiency in information included in a first response generated according to the candidate. The processors decide one of the candidates as the operation for generating the response based on a determination result. The processors generate a second response according to the decided operation.

Hereinafter, preferred embodiments of an information processing apparatus, a computer program product, and an information processing method according to the present disclosure will be described in detail with reference to the accompanying drawings.

As described above, a dialogue system that outputs a response to an input sentence from a user has been proposed. For example, it is assumed that the dialogue system has retrieved a large number of pieces of related information because the search query input by the user is ambiguous. In such a situation, if a large number of pieces of information are presented to the user as they are, the user needs to confirm the large number of pieces of information one by one, which takes time and effort. In the dialogue system, it is preferable that the user can easily obtain desired information even in such a situation.

As a technique for performing a search in consideration of ambiguity, a technique is proposed that extracts keywords from a search query which is input by a user, and determines a degree of ambiguity of the search query based on modifier information between the keywords and the frequency of appearance of the keywords in the search target.

However, the search query being ambiguous and the search result including appropriate information are not necessarily associated with each other. For example, even in a case where a search query is ambiguous and a plurality of search results are obtained, it may be possible to present only information desired by the user by excluding unnecessary information at a response generation stage. In such a case, it is better to respond than to resolve ambiguity, because it takes extra time and effort for the user if the system asks back the user.

The aforementioned technique for determining ambiguity does not perform such a determination, and therefore, the user may not be able to easily search for desired information.

The information processing apparatus according to the following embodiment generates operation candidates to be taken next by the information processing apparatus (hereinafter, "operation candidates") from a search query and search results, determines whether information desired by the user can be appropriately (without excess or deficiency) provided for each operation candidate, and generates a response according to one operation candidate selected based on a determination result. As a result, the user can more efficiently search for desired information.

FIG. 1 is a block diagram illustrating an example of a configuration of an information processing apparatus 100 according to the present embodiment. As illustrated in FIG. 1, the information processing apparatus 100 includes a storage unit 121, a display unit 122, a search unit 101, a candidate generation unit 102, a determination unit 103, a decision unit 104, a response generation unit 105, and an output control unit 106.

The storage unit 121 stores various types of information used in the information processing apparatus 100. For example, the storage unit 121 stores data (text group) as a search target.

Note that the storage unit 121 can be configured by any commonly used storage medium such as a flash memory, a memory card, a random access memory (RAM), a hard disk drive (HDD), or an optical disc.

The display unit 122 is configured to display various types of information used in the information processing apparatus 100, and is realized by, for example, a display device such as a liquid crystal display.

The search unit 101 retrieves one or more texts that match the search query from the text group that is a search target. The search query is input by the user using an input device such as a keyboard. The search unit 101 receives the input search query, searches the text group that is a search target, and outputs search results to the candidate generation unit 102.

The candidate generation unit 102 generates one or more operation candidates that are candidates for an operation for generating a response to the search query, using the search query and one or more texts that are search results by the search unit 101. The candidate generation unit 102 outputs the generated operation candidates to the determination unit 103.

For each of the generated operation candidates, the determination unit 103 determines whether there is excess or deficiency in information included in a response R1 (first response) generated according to the operation candidate. The determination unit 103 outputs a determination result to the decision unit 104.

The decision unit 104 determines one of the one or more operation candidates as an operation for generating a response to be output by the information processing apparatus 100 based on the determination result by the determination unit 103. The decision unit 104 outputs the decided operation to the response generation unit 105.

The response generation unit 105 generates a response R2 (second response) according to the decided operation. The response R2 is a response finally presented to the user according to the search query and the search results.

The output control unit 106 controls output of various types of information used in the information processing apparatus 100. For example, the output control unit 106 outputs the response R2 generated by the response generation unit 105. The response R2 may be output by any method. For example, the following method can be applied.

Text information indicative of the response R2 is displayed on the display unit 122 or a display device of a device used by the user.

A voice indicating the response R2 is output to the information processing apparatus 100 or a voice output device such as a speaker included in a device used by the user. The voice is generated by voice synthesis or the like with respect to text information indicative of the response R2.

At least a part of each unit (the search unit 101, the candidate generation unit 102, the determination unit 103, the decision unit 104, the response generation unit 105, and the output control unit 106) may be realized by one or more processing units. Each of the above-described units is realized by, for example, one or more processors. For example, each of the above-described units may be realized by causing processors such as a central processing unit (CPU) and a graphics processing unit (GPU) to execute a program, that is, by software. Each of the above-described units may be realized by a processor such as a dedicated integrated circuit (IC), that is, by hardware. Each of the above-described units may be realized by using software and hardware in combination. When a plurality of processors are used, each of the processors may realize one of the units or realize two or more of the units.

Furthermore, the information processing apparatus 100 may be physically configured by one apparatus or may be physically configured by a plurality of apparatuses. For example, the information processing apparatus 100 may be constructed in a cloud environment. Furthermore, each unit in the information processing apparatus 100 may be provided in a distributed manner in a plurality of apparatuses.

Figure 2:
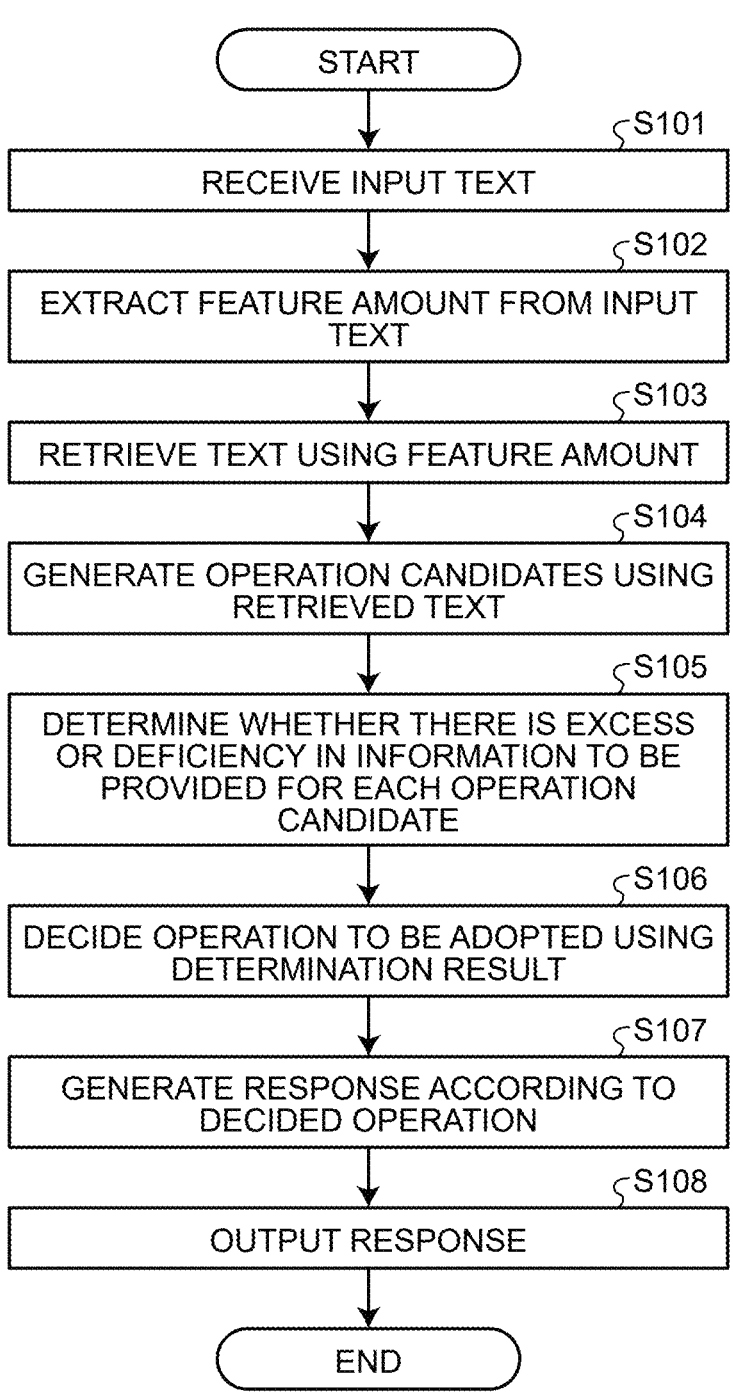
FIG. 2 is a flowchart of a response generation process according to the embodiment.

Next, a response generation process performed by the information processing apparatus 100 according to the present embodiment will be described. FIG. 2 is a flowchart illustrating an example of a response generation process in the present embodiment.

The search unit 101 receives an input text input by the user as a search query (step S101). The input text (search query) may be a text input by a keyboard, or may be a text transcribed by recognizing a voice input from a voice input device such as a microphone.

The search unit 101 extracts a feature amount from the input search query (input text) (step S102). The feature amount may be any information as long as the information indicates a feature of the search query. For example, the feature amount may be one or more keywords extracted from the search query, or may be a vector (an embedding vector or the like) representing the meaning of the search query. In a case where the feature amount is a keyword, the search unit 101 extracts, for example, a noun included in the search query, and uses the extracted noun as a keyword. In a case where the feature amount is a vector, the search unit 101 converts the search query into a vector using a deep learning model such as BERT (Bidirectional Encoder Representations from Transformers) and Transformer.

The search unit 101 retrieves one or more texts related to the search query from data (text group) that is a search target using the extracted feature amount (step S103). For example, in a case where a keyword is used as the feature amount, the search unit 101 retrieves a text including the keyword. For example, in a case where a vector is used as the feature amount, the search unit 101 retrieves a text having a vector whose degree of similarity to the vector is equal to or greater than a threshold. The vector of each text may be generated in advance and stored, for example, in the storage unit 121.

The candidate generation unit 102 receives the text obtained as a search result and the search query from the search unit 101, and generates candidates for an operation to be performed next by the information processing apparatus 100 (operation candidates) (step S104). The candidate generation unit 102 generates operation candidates by, for example, the following generation method M1 or M2.

(M1) One or more operation candidates corresponding to the search query and the search result are selected from among a plurality of predetermined candidates.

(M2) An operation candidate is dynamically generated from the search query and the search result.

First, a specific example of (M1) will be described. The predetermined operation candidates are operation candidates that can be generally used for various search queries and search results. These operation candidates are stored in advance, for example, in the storage unit 121. Hereinafter, examples of the predetermined operation candidates will be described.

(E1-1) Operation of "generating response sentences from all search results"

(E1-2) Operation of "generating a response sentence to the search query by adding a fixed character string such as "What do you want to know about * *?" or "is ** OK?"

(E1-3) Operation of "generating an apologetic response sentence such as "Sorry, no information found", when no search result is obtained For example, when the number of texts obtained as search results is equal to or smaller than a threshold, the candidate generation unit 102 selects operation candidates of (E1-1). When the number of texts obtained as search results is larger than the threshold, the candidate generation unit 102 selects operation candidates of (E1-2). (E1-2) is an operation of asking a question back for inputting additional information. A keyword or the like extracted from the search query may be set in the portion of "". In addition, the candidate generation unit 102** generates operation candidates of (E1-3) when no texts have been obtained as search results (the number of texts is 0).

Next, a specific example of (M2) will be described. The dynamically generated operation candidate is an operation candidate for performing a more flexible response according to the search situation.

For example, it is assumed that a large number of search results are obtained in response to a search query "Why does the screen remain black even when the PC is powered on?". In addition, it is assumed that the large number of search results include approximately equal amounts of information related to a personal computer (PC) main body, information related to a display, and information related to a cable connecting the PC main body and the display.

In such a case, the candidate generation unit 102 generates an operation candidate "Generate a response sentence from category information (PC main body, display, cable)". Note that a response sentence generated using this operation candidate is, for example, a sentence such as "A failure of the PC main body, a failure of the display, and a failure of the cable may be considered . . . ".

In addition, it is assumed that there are 30 search results for the same search query as above, which is "the cause for the screen remaining black even when the PC is powered on", among the 30 search results, 25 search results are related to both the PC main body and the display, and the remaining 5 search results are related to the cable, the graphic board, and the scene setting.

In such a case, the candidate generation unit 102 generates an operation candidate "Generate a response sentence from category information (PC main body, display, and others)". Note that a response sentence generated using this operation candidate is, for example, a sentence such as "A failure of the PC main body, a failure of the display, and other failures may be considered . . . ".

The above-described example is an example of dynamically generating an operation candidate in which different category information is set according to the search results. The candidate generation unit 102 may dynamically generate such an operation candidate using, for example, a rule created in advance.

In the example in which the category information is set, for example, the following rule is used.

In a case where search results can be clustered approximately evenly, the title of each cluster is extracted as category information, and the extracted category information is set in "" of the operation template "Generate a response sentence from the category information ()" to generate operation candidates.

For example, the following methods can be applied to the clustering of the search results and the determination of the title.

When a group of texts including a plurality of clauses and chapters is a search target, clustering is performed by a chapter or clause including a keyword included in the search query, and a title of the chapter or clause is set as a title of each cluster.

Clustering is performed based on keywords appearing in each search result, and a keyword that appears most frequently in comparison to the other clusters is used as the title of that cluster.

Each search result is converted into a vector using a deep learning model or the like, clustering is performed based on similarity between vectors, and a title is generated from information assigned to each cluster by summarization using another deep learning model or the like. The information assigned to the cluster is, for example, a search result (text) classified into the cluster.

Another example in which an operation candidate is dynamically generated will be described. It is assumed that, in response to a search query "ABC2.0 cannot be activated", a search result including only information related to "ABC1.0" is obtained. In such a case, the candidate generation unit 102 generates, for example, an operation candidate "Ask back if it is ABC1.0 and generate a response sentence from information on ABC1.0". Note that the response sentence generated using this operation candidate is, for example, a sentence such as "Is it ABC1.0? In that case . . . ".

In this example, for example, the following rule is used.

When there is one search result, the search result is presented, and when there is a difference between the search query and the search result, a question is asked back about the difference.

The difference can be detected by, for example, the following method.

Partially matching compound nouns are detected as the difference. In the above example, the compound nouns "ABC1.0" and "ABC2.0", which match in the portion "ABC", correspond to the difference.

Modification relationships are analyzed, and when different phrases modify the same keyword in the search query and in the search result, the modifying phrases are detected as the difference.

Referring back to FIG. 2, the explanation will be made. The determination unit 103 determines whether there is excess or deficiency in information to be provided for each of the one or more operation candidates generated by the candidate generation unit 102 (step S105). For example, the determination unit 103 determines whether the information to be provided in response to the search query can be provided without excess or deficiency by a response generated according to the operation candidate.

For example, the determination unit 103 determines whether there is excess or deficiency in information included in a response R1 generated according to the operation candidate by using a result of comparison between one or more pieces of topic information T1 (first topic information) included in the response R1 and one or more pieces of topic information T2 (second topic information) extracted from the search query.

The topic information is information indicative of a topic of a text (a search query or a text group that is a search target). The topic information may be extracted by any method. For example, the following method can be applied.

The title of the chapter or clause of the retrieved text is extracted as topic information.

A technique for extracting a topic from a text is used. For example, topic information for the input text is extracted using a model such as a generative artificial intelligence (AI) model.

When the topic information T2 is not included in the topic information T1, the determination unit 103 determines that the information included in the response R1 is deficient. Furthermore, when topic information different from the topic information T2 is included in the topic information T1, the determination unit 103 determines that the information included in the response R1 is excessive.

For example, it is assumed that the following two search results are obtained in response to a search query "Tell me the power consumption of product ABC".

"The power consumption of product ABC is 200 watts"
"The power consumption of product ABC is about 200 watts on average, maximum 400 watts in a high-load state, and 60 watts in a standby state"

In addition, it is assumed that an operation candidate "Return a response from a search result" is generated. In this case, the determination unit 103 generates, for example, a response sentence "The power consumption of product ABC is 200 watts" using the operation candidate. A method of generating one response sentence from a plurality of search results may be any method. For example, a model such as a generative AI model trained to output a response sentence when one or more search results are input can be used.

The determination unit 103 extracts "product ABC" and "power consumption" as the topic information T1 from the generated response sentence (response R1). Furthermore, the determination unit 103 extracts "product ABC" and "power consumption" as the topic information T2 from the search query.

In this example, since the topic information T1 and the topic information T2 match, the determination unit 103 determines that there is no excess or deficiency in the information included in the generated response sentence (response R1).

As another example, it is assumed that the following three search results are obtained because a search query "Tell me the power consumption", which does not specify a product, is input.

"The power consumption of product ABC is 200 watts"
"The power consumption of product ABC is about 200 watts on average, maximum 400 watts in a high-load state, and 60 watts in a standby state"
"The power consumption of product DEF is 240 watts"

Furthermore, it is assumed that an operation candidate "Return a response from a search result" is generated in the same manner as described above. The determination unit 103 generates, for example, a response sentence "The power consumption of product ABC is 200 watts, and the power consumption of product DEF is 240 watts" using the operation candidate.

The determination unit 103 extracts "product ABC", "product DEF", and "power consumption" as the topic information T1 from the generated response sentence (response R1). In this case, since the topic information "product DEF" different from the topic information T2 is included in the topic information T1, the determination unit 103 determines that the information included in the response sentence (response R1) is excessive.

It is assumed that "Ask back if it is product ABC or DEF and return a response from a search result for an additional input" is generated as an operation candidate. In this case, the determination unit 103 generates a pseudo additional input in response to the question asked back, and obtains a pseudo search result for the generated input. For example, the determination unit 103 generates two pseudo inputs "product ABC" and "product DEF", and obtains narrowed-down search results for each of the two inputs.

For the input "product ABC", the search query, the search result, and the topic information are as follows.

Search query: "Tell me the power consumption" and "Product ABC"
Topic information of search query: "Product ABC" and "Power consumption"
Search result: "The power consumption of product ABC is 200 watts", and "The power consumption of product ABC is about 200 watts on average, maximum 400 watts in a high-load state, and 60 watts in a standby state"
Topic information of response based on search result: "Product ABC" and "Power consumption"

For the input "product DEF", the search query, the search result, and the topic information are as follows.

Search query: "Tell me the power consumption" and "Product DEF"
Topic information of search query: "Product DEF" and "Power consumption"
Search result: "The power consumption of product DEF is 240 watts"
Topic information of response based on search result: "Product DEF" and "Power consumption"

In any case, since the topic information of the search query matches the topic information of the response, the determination unit 103 determines that there is no excess or deficiency in the information included in the generated response. That is, the determination unit 103 determines that there is no excess or deficiency in the provided information for the operation candidate "Ask back if it is product ABC or DEF and return a response from a search result for an additional input".

The determination unit 103 may output, as a determination result, a score (hereinafter, "a determination score") indicating whether there is excess or deficiency in the information included in the response R1 generated according to the operation candidate. The determination score can be interpreted as indicating a degree to which the response R1 generated according to the operation candidate can provide information without excess or deficiency. The determination score may be represented by a real value ranging from a lower limit value (e.g., 0) to an upper limit value (e.g., 1).

The determination unit 103 may calculate the determination score by any method. For example, a method using a model such as a deep learning model trained in advance can be used. This model is trained, for example, to return a real value between 0 and 1 when a search query and a search result are input as follows.

First, before training, a search query, training data (training sample) including a search result serving as a positive example for the search query, and training data including a search result serving as a negative example for the search query are prepared.

The positive example corresponds to training data including a correct search result corresponding to the search query. The negative example is training data including an erroneous search result corresponding to the search query, and is, for example, the following data.

training data including search results including excessive information not related to the search query, as well as information related to the search query training data including search results that are missing at least some of necessary information training data including search results including information irrelevant to the search query For example, the model is trained to output 1 in the positive example and output 0 in the negative example.

When calculating a determination score, the determination unit 103 may use a large language model (LLM) trained in advance. The LLM is trained to, for example, output a determination score when a search query, a search result, and a prompt for inquiring as to whether there is excess or deficiency in information are input.

Referring back to FIG. 2, the explanation will be made. The decision unit 104 decides an operation to be performed by the information processing apparatus 100 from among the one or more operation candidates generated by the candidate generation unit 102 based on the determination result of the determination unit 103 (step S106). For example, the decision unit 104 ranks the operation candidates according to the rule using the determination result, and selects an operation candidate having the highest rank (rank) as an operation to be adopted. As a rule for ranking, for example, the following rule can be used.

The operation candidate for generating a response without excess or deficiency is ranked higher.

The operation candidate having a larger number of pieces of topic information T1 that match the topic information T2 extracted from the search query is ranked higher.

The operation candidate having a smaller number of pieces of topic information T1 that do not match the topic information T2 extracted from the search query is ranked higher.

When the determination unit 103 calculates and outputs a determination score, the decision unit 104 may use a rule for ranking according to the value of the determination score.

The response generation unit 105 generates a response with reference to the search query and the search result according to the operation decided by the decision unit 104 (step S107). The response generation unit 105 may use the same method as or a different method from the method by which the determination unit 103 generates a response at the time of determination.

The response generation unit 105 may generate a response by the following method.

A response is generated by embedding information on a search query and a search result in a response sentence template prepared in advance and corresponding to an operation.

An output obtained by inputting a prompt in which an operation, a search query, and a search result are embedded as a context to the LLM trained in advance is used as a response.

The response sentence template is prepared, for example, for each operation. For example, the response sentence template is a sentence such as " has been found" including a placeholder "". One or more keywords extracted from the search result are embedded in the placeholder.

When the LLM is used, the response generation unit 105 inputs, for example, a task content instruction such as "Generate an assistant's response sentence to the search query based on the following search query, operation, and search result", a search query, an operation, and a search result to the LLM as a prompt, such that the LLM generates a response sentence.

The response generation unit 105 may generate a response sentence using the search result as it is, or may generate a response sentence using a text obtained by editing the search result. For example, when the data size of the search results is small and all the search results can be displayed on the display screen, the response generation unit 105 may embed the search results as they are in the response sentence. When the data size of the search results is large and all the search results cannot be displayed on the display screen, the response generation unit 105 may summarize each of the search results into a short sentence (summary sentence) and generate a response sentence using the summary sentence.

Referring back to FIG. 2, the explanation will be made. The output control unit 106 outputs the generated response sentence (step S108), and ends the response generation process.

As described above, in the present embodiment, it is possible to generate and output a response including information required by a search query without excess or deficiency. For example, even in a case where a large number of search results can be obtained, since a response including excessive information is not output, the user can search for desired information more efficiently.

First Modification

The first modification explains an example in which a determination criterion used in determining for excess or deficiency is settable.

Figure 3:
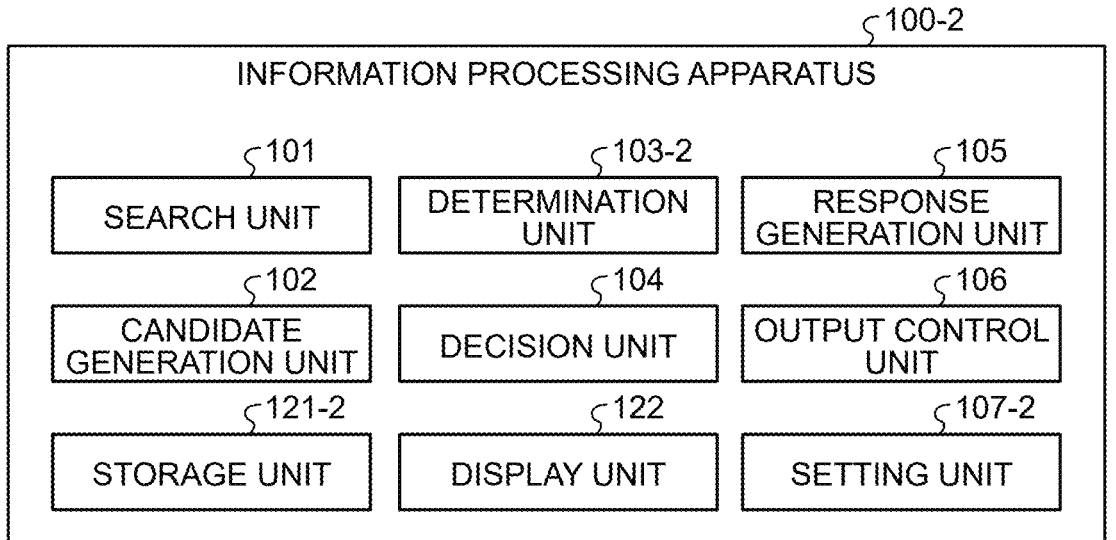
FIG. 3 is a block diagram of an information processing apparatus according to a first modification.

FIG. 3 is a block diagram illustrating an example of a configuration of an information processing apparatus 100-2 according to the first embodiment of the embodiment. As illustrated in FIG. 3, the information processing apparatus 100-2 includes a storage unit 121-2, a display unit 122, a search unit 101, a candidate generation unit 102, a determination unit 103-2, a decision unit 104, a response generation unit 105, an output control unit 106, and a setting unit 107-2.

In the first modification, the setting unit 107-2 is added, and the functions of the determination unit 103-2 and the storage unit 121-2 are different from those of the above-described embodiment. Other configurations and functions are similar to those in FIG. 1, which is a block diagram of the information processing apparatus 100 according to the above-described embodiment, and thus, are denoted by the same reference numerals, and description thereof is omitted here.

The setting unit 107-2 sets a determination criterion used for determination by the determination unit 103-2. For example, the setting unit 107-2 sets the determination criterion according to at least one of user information and priority information.

The storage unit 121-2 is different from the storage unit 121 of the above-described embodiment in that at least one of user information and priority information is further stored.

First, the setting of the determination criterion according to the user information will be described. The user information is information regarding the user to be considered when it is determined that there is excess or deficiency. For example, the user information includes at least one of information indicative of an attribute (characteristic) of a user who inputs a search query (hereinafter, "user attribute information") and information indicative of an attribute of a device used by the user (hereinafter, "device information"). The user information may be input by the user, for example, via a device used by the user.

The device information is, for example, information for specifying a method by which the device outputs a response, an ability of the device to output a response, and the like. For example, the device information may be information capable of specifying one of the response being displayed on the display device and the response being voice output as a response output method. The device information may be information capable of specifying the size of the display device or the like as a response outputting ability.

The response output method and the amount of information in the response to be output vary depending on whether the device used by the user is a device including a display device such as a PC or a device including only a voice output device. For example, in a device including a display device, a faster response is preferred even if the response includes excessive information. On the other hand, in a device including only a voice output device, it is preferable to output only the minimum necessary information, because it takes a very long time and is difficult to listen to the entire response as voice.

In order to perform such adjustment depending on the device, the setting unit 107-2 sets a determination criterion for determining whether there is excess or deficiency in information according to the device information. The determination criterion represents, for example, a threshold for the number of pieces of topic information.

For example, when the device information indicates that the device includes a display device, the setting unit 107-2 sets the threshold to a larger value. As a result, it is possible to configure the device to output a response if the response includes an excessive number of pieces of topic information equal to or smaller than the threshold. For example, when the device information indicates that the device includes only a voice output device, the setting unit 107-2 sets the threshold to a smaller value. This makes it possible to minimally output a response including excessive topic information.

The determination unit 103-2 determines whether there is excess or deficiency in information included in the response R1 using the determination criterion set by the setting unit 107-2. For example, when the number of pieces of topic information different from the topic information T2 extracted from the search query and included in the topic information T1 included in the response R1 is larger than a threshold TH1, the determination unit 103-2 determines that the information included in the response R1 is excessive.

A threshold TH2 for determining that the information included in the response R1 is deficient may be used together with or instead of the threshold TH1 for determining that the information included in the response R1 is excessive. For example, when the number of pieces of topic information T2 not included in the topic information T1 is larger than the threshold TH2, the determination unit 103-2 determines that the information included in the response R1 is deficient.

The user attribute information is, for example, the following information.

Information indicative of whether the user is familiar with the search target field Information indicative of whether the user wants an immediate answer even if it is rough or wants a more appropriate answer through a dialogue An example of processing using the first user attribute information will be described. For example, when user attribute information indicating that the user is familiar with the search target field is obtained, the setting unit 107-2 sets the threshold to a smaller value. For example, when user attribute information indicating that the user is not familiar with the search target field is obtained, the setting unit 107-2 sets the threshold to a larger value.

For example, it is assumed that the search targets are manuals for a plurality of home appliances, and the user possesses a specific home appliance among the plurality of home appliances. In such a case, user attribute information indicating that the user is familiar with the search target field is set for the specific home appliance.

The setting unit 107-2 sets a determination criterion for the specific home appliance to more strictly determine whether there is excess or deficiency. For example, the setting unit 107-2 sets a threshold as the determination criterion to a smaller value. On the other hand, the setting unit 107-2 sets the determination criterion for home appliances other than the specific home appliance to more loosely determine whether there is excess or deficiency. For example, the setting unit 107-2 sets a threshold as the determination criterion to a larger value.

For example, the determination unit 103-2 determines which home appliance the response R1 generated according to the operation candidate is related to, and determines whether there is excess or deficiency using the determination criterion for the determined home appliance.

As a result, it is possible to accurately provide required information for home appliances that the user knows in detail (for example, possesses), while quickly providing information indicative of an outline for other home appliances that the user does not know in detail.

An example of processing using the second user attribute information will be described. In order to solve the excess or deficiency of the information included in the response, a question may be asked back to the user. However, when a question is asked back to the user, more time is required until desired information is obtained. For this reason, some users may prioritize obtaining information as fast as possible, and prefer to reduce the number of times a question is asked back, on the premise that the user himself/herself selects information from the rough information. On the other hand, some users may prioritize obtaining more appropriate information, and prefer to be provided with only appropriate information, even if the number of times a question is asked back is large, rather than the user himself/herself making a selection from among a large number of pieces of information.

Therefore, for example, when user attribute information indicating that the user wants an immediate answer even if it is rough is obtained, the setting unit 107-2 sets the threshold to a larger value. For example, when user attribute information indicating that the user wants a more appropriate answer through a dialogue is obtained, the setting unit 107-2 sets the threshold to a smaller value.

The setting unit 107-2 can adjust the determination criterion used for determining whether there is excess or deficiency according to the user's preference. This makes it possible to realize a dialogue suitable for the user's preference.

Next, the setting of the determination criterion according to the priority information will be described. The priority information is, for example, information indicative of, for each piece of topic information, prioritizing the topic information or not-prioritizing the topic information. The priority information may be set in any way, and can be set by, for example, the following method.

Method in which history information extracted from use logs of the information processing apparatus 100 is set as priority information Method in which priority information is set according to an input from an administrator of the information processing apparatus 100 or the like When a large number of use logs are accumulated, a rough tendency is obtained regarding the operation of the information processing apparatus 100, the selection by the user for the operation, and the like. For example, a tendency such as "When a question is asked back for a certain search query, the same option is selected in almost all cases." and "This question is rarely selected". The information indicative of this tendency can be interpreted as history information (priority information) indicating that topic information selected more frequently than other topic information is prioritized.

In addition, for example, immediately after a new product (new function) is announced, inquiries about the new product may temporarily increase. In such a case, priority information indicating that topic information related to the new product is prioritized may be used in order to easily output information related to the new product in the response. Such priority information may be input by, for example, an administrator of the information processing apparatus 100.

For example, the setting unit 107-2 sets a determination criterion for determining that the topic information indicated to be prioritized by the priority information is topic information that is not determined to be excessive.

For example, when topic information different from the topic information T2 extracted from the search query and included in one or more pieces of topic information T1 included in the response R1 is not included in topic information that is not determined to be excessive, the determination unit 103-2 determines that the information included in the response R1 is excessive.

Figure 4:
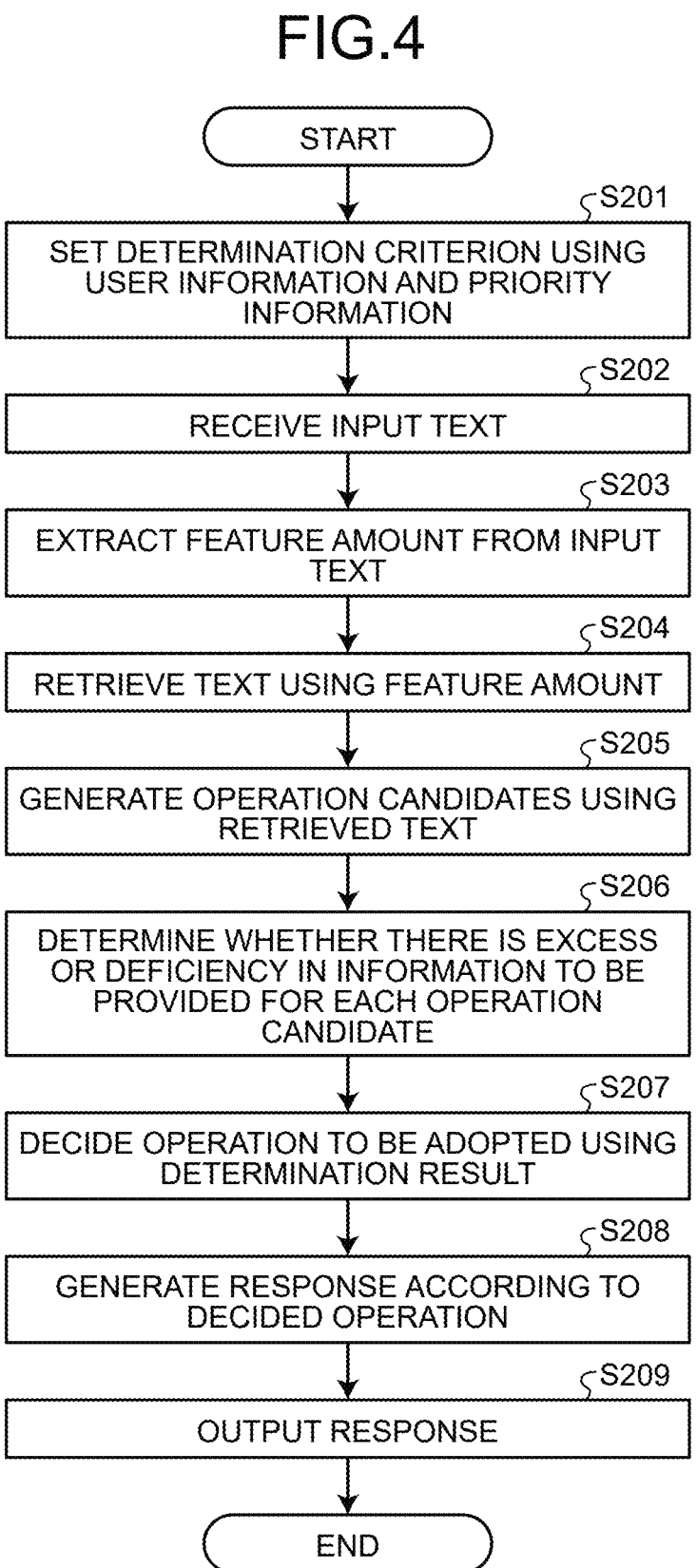
FIG. 4 is a flowchart of a response generation process according to the first modification.

Next, a response generation process performed by the information processing apparatus 100-2 according to the first modification will be described with reference to FIG. 4. FIG. 4 is a flowchart illustrating an example of a response generation process in the first modification.

The setting unit 107-2 receives user information and priority information, and sets a determination criterion used in the determination by the determination unit 103-2 according to the received user information and priority information (step S201).

Since steps S202 to S205 are similar to steps S101 to S104 in the information processing apparatus 100 of the above-described embodiment, the description thereof will be omitted.

In the present modification, the determination unit 103-2 determines there is excess or deficiency in information for each of the operation candidates using the set determination criterion (step S206).

Since steps S207 to S209 are similar to steps S106 to S108 in the information processing apparatus 100 of the above-described embodiment, the description thereof will be omitted.

As described above, in the first modification, the operation to be performed by the information processing apparatus 100 can be appropriately selected according to the user's situation or the like. As a result, it is possible to provide information within a user allowable range without asking an unnecessary question.

Second Modification

The second modification explains an example in which information indicative of excess or deficiency (excess or deficiency information) can be output.

Figure 5:
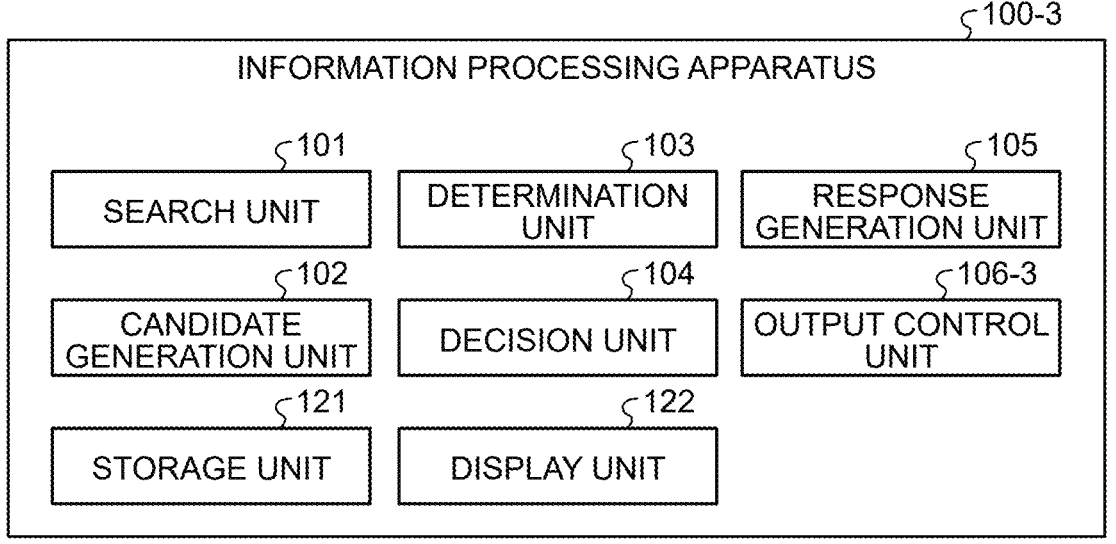
FIG. 5 is a block diagram of an information processing apparatus according to a second modification.

FIG. 5 is a block diagram illustrating an example of a configuration of an information processing apparatus 100-3 according to the second modification of the embodiment. As illustrated in FIG. 5, the information processing apparatus 100-3 includes a storage unit 121, a display unit 122, a search unit 101, a candidate generation unit 102, a determination unit 103, a decision unit 104, a response generation unit 105, and an output control unit 106-3.

In the second modification, the function of the output control unit 106-3 is different from that in the above-described embodiment. Other configurations and functions are similar to those in FIG. 1, which is a block diagram of the information processing apparatus 100 according to the above-described embodiment, and thus, are denoted by the same reference numerals, and description thereof is omitted here.

The output control unit 106-3 is different from the output control unit 106 of the above-described embodiment in that it has a function of generating and outputting excess or deficiency information to be presented to the user using a search query, a search result, an operation, and a determination result by the determination unit 103.

The excess or deficiency information is information indicative of how the response and the search result are excessive or deficient with respect to the search query. The excess or deficiency information is used to convey an excessive or deficient state to the user in an easy-to-understand manner.

For example, the output control unit 106-3 generates and outputs excess or deficiency information indicative of, as the topic information, one of topic information with no excess or deficiency, excessive topic information, and deficient topic information as follows.

Topic information with no excess or deficiency: topic information included in both the topic information T1 included in the response R1 and the topic information T2 extracted from the search query Excessive topic information: topic information included in the topic information T1 but not included in the topic information T2

Deficient topic information: topic information included in the topic information T2 but not included in the topic information T1

Note that, in the web search technology, for example, when a search query "television malfunction" is input, narrowed-down search queries such as "television malfunction, no image on screen" and "television malfunction, lines appearing" may be proposed as highly relevant search queries. In addition, when a search is performed using a search query including a plurality of keywords that are highly unlikely to be included in one text, such as "malfunction, pi", supplementary information such as "not included: malfunction|required: malfunction" may be displayed for a search result that only hits "pi" but not "malfunction". This makes it easy to understand the correspondence with the search query when looking through a list of search results. In addition, it is possible to narrow down search results without having to look through search results including excessive information.

On the other hand, the excess or deficiency information of the present modification can indicate which portion of the search query information is provided about in the response sentence, which portion is excessive, and which portion is deficient. For example, in a response sentence "Is it ABC1.0? In that case . . . " to the search query "ABC2.0 cannot be activated", the portion "ABC2.0" in the beginning of the search query sentence corresponds to a deficient portion in the response sentence.

The output control unit 106-3 may output a response together with excess or deficiency information. In addition, the output control unit 106-3 may output a plurality of pieces of topic information in different excess or deficiency states in different output modes using the excess or deficiency information. For example, the output control unit 106-3 may output excessive topic information and topic information with no excess or deficiency in an output format that emphasizes the topic information with no excess or deficiency.

The output format may be any format. For example, in a case where a response is displayed, the output format includes a color of a character to be displayed, a size of the character, a font type, with or without strikethrough, overwriting with a cross mark, a color of a background, or the like. As a result, the user can intuitively grasp search results. In a case where a response is reproduced by voice synthesis, the output format includes, for example, a volume, a speech speed, and insertion of short pause or sound effect back and forth. As a result, the user can intuitively grasp excess or deficiency without checking the screen.

Next, a response generation process performed by the information processing apparatus 100-3 according to the second modification will be described with reference to FIG. 6. FIG. 6 is a flowchart illustrating an example of a response generation process in the second modification.

Since steps S301 to S307 are similar to steps S101 to S107 in the information processing apparatus 100 of the above-described embodiment, the description thereof will be omitted.

The output control unit 106-3 generates excess or deficiency information to be presented to the user from the operation to be performed next by the information processing apparatus 100-3, the excess or deficiency determination result for the operation, the search results, and the search query (step S308). The output control unit 106-3 outputs the response sentence generated in step S307 and the excess or deficiency information generated in step S308 (step S309), and ends the response generation process.

As described above, according to the present embodiment, since the response is generated based on the operation according to whether the information processing apparatus can provide the information desired by the user without excess or deficiency, the user can more efficiently search for the desired information.

Figure 7:
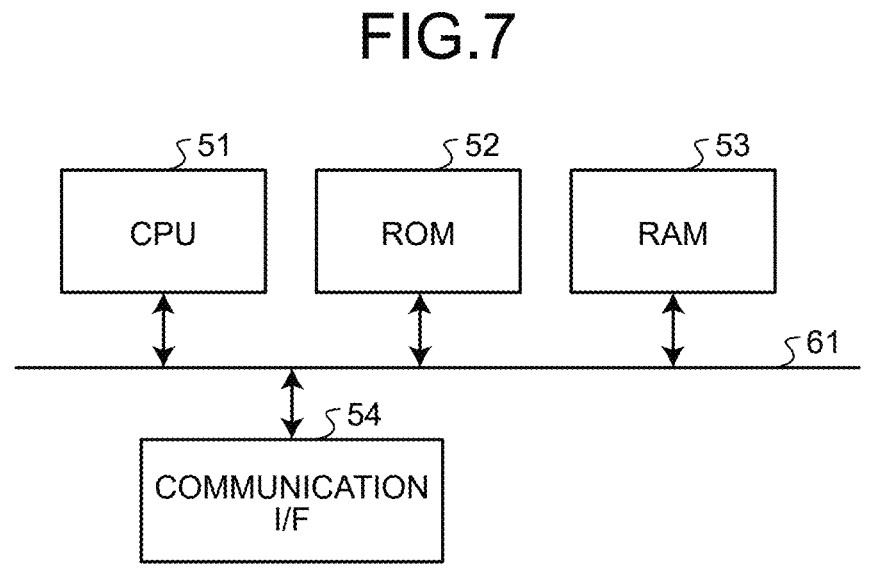

Next, a hardware configuration of the information processing apparatus according to the embodiment will be described with reference to FIG. 7. FIG. 7 is an explanatory diagram illustrating a hardware configuration example of the information processing apparatus according to the embodiment.

The information processing apparatus according to the embodiment includes a control device such as a central processing unit (CPU) 51, a storage device such as a read only memory (ROM) 52 and a random access memory (RAM) 53, a communication I/F 54 connected to a network to perform communication, and a bus 61 connecting the units to each other.

A program executed by the information processing apparatus according to the embodiment is provided by being incorporated in the ROM 52 or the like in advance.

The program executed by the information processing apparatus according to the embodiment may be provided as a computer program product by being recorded in a computer-readable recording medium, such as a compact disk read only memory (CD-ROM), a flexible disk (FD), a compact disk recordable (CD-R), or a digital versatile disk (DVD), as a file in an installable format or in an executable format.

Furthermore, the program executed by the information processing apparatus according to the embodiment may be stored on a computer connected to a network such as the Internet, and provided by being downloaded via the network. In addition, the program executed by the information processing apparatus according to the embodiment may be provided or distributed via a network such as the Internet.

The program executed by the information processing apparatus according to the embodiment can cause a computer to function as each of the units of the information processing apparatus described above. In this computer, the CPU 51 can read the program from the computer-readable storage medium onto a main storage device and execute the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
one or more hardware processors configured to:
retrieve one or more texts that match a search query from a text group that is a search target;
generate one or more candidates for an operation for generating a response to the search query using the search query and the retrieved texts;
determine, for each of the candidates, whether there is excess or deficiency in information included in a first response generated according to the candidate;
decide one of the one or more candidates as the operation for generating the response based on a determination result; and
generate a second response according to the decided operation,
wherein:
the one or more hardware processors determine whether there is excess or deficiency in the information included in the first response, using a result of comparison between one or more pieces of first topic information included in the first response and one or more pieces of second topic information extracted from the search query, and
the one or more hardware processors determine that the information included in the first response is deficient when the second topic information is not included in the first topic information, and determine that the information included in the first response is excessive when topic information different from the second topic information is included in the first topic information.

2. The information processing apparatus according to claim 1, wherein
the one or more hardware processors output, as the determination result, a score indicating whether there is excess or deficiency in the information included in the first response.

3. The information processing apparatus according to claim 1, wherein the one or more hardware processors are configured to:
set a determination criterion to be used in determining whether there is excess or deficiency in the information included in the first response, and
determine whether there is excess or deficiency in the information included in the first response generated according to the candidate in accordance with the determination criterion.

4. The information processing apparatus according to claim 3, wherein the one or more hardware processors set the determination criterion using user information indicative of at least one of an attribute of a user who inputs the search query and an attribute of a device used by the user.

5. The information processing apparatus according to claim 3, wherein the determination criterion represents a threshold for a number of pieces of topic information, and the one or more hardware processors determine that the information included in the first response is excessive when the number of pieces of topic information different from the one or more pieces of the second topic information extracted from the search query and included in the one or more pieces of the first topic information included in the first response is larger than the threshold.

6. The information processing apparatus according to claim 3, wherein the determination criterion represents topic information that is not determined to be excessive, and the one or more hardware processors determine that the information included in the first response is excessive when topic information different from the one or more pieces of the second topic information extracted from the search query and included in the one or more pieces of the first topic information included in the first response is not included in the topic information that is not determined to be excessive.

7. The information processing apparatus according to claim 6, wherein the one or more hardware processors set the determination criterion using priority information indicative of, for each piece of topic information, prioritizing the topic information or not-prioritizing the topic information.

8. The information processing apparatus according to claim 1, wherein the one or more hardware processors are configured to:

output excess or deficiency information indicative of, as topic information included in at least one of the search query and the second response, one of topic information included in both of the one or more pieces of the first topic information included in the first response and the one or more pieces of the second topic information extracted from the search query, topic information included in the first topic information but not included in the second topic information, and topic information included in the second topic information but not included in the first topic information.

9. The information processing apparatus according to claim 1, wherein the one or more hardware processors are configured to convert the search query into a first vector using a learning model and retrieve the one or more texts having a second vector that is similar to the first vector.

10. A computer program product having a non-transitory computer readable medium including programmed instructions stored thereon, wherein the instructions, when executed by a computer, cause the computer to execute:

retrieving one or more texts that match a search query from a text group that is a search target;

generating one or more candidates for an operation for generating a response to the search query using the search query and the retrieved texts;

determining, for each of the candidates, whether there is excess or deficiency in information included in a first response generated according to the candidate;

deciding one of the one or more candidates as the operation for generating the response based on a determination result that is determined at the determining; and generating a second response according to a decided operation;

wherein the determining comprises:

determining whether there is excess or deficiency in the information included in the first response using a result of comparison between one or more pieces of first topic information included in the first response and one or more pieces of second topic information extracted from the search query, and determining that the information included in the first response is deficient when the second topic information is not included in the first topic information, and determining that the information included in the first response is excessive when topic information different from the second topic information is included in the first topic information.

11. The computer program product according to claim 10, wherein the instructions, when executed by the computer, further cause the computer to execute converting the search query into a first vector using a learning model and retrieving the one or more texts having a second vector that is similar to the first vector.

12. An information processing method executed by a hardware processor of an information processing apparatus, the information processing method comprising:

retrieving one or more texts that match a search query from a text group that is a search target;

generating one or more candidates for an operation for generating a response to the search query using the search query and the retrieved texts;

determining, for each of the candidates, whether there is excess or deficiency in information included in a first response generated according to the candidate;

deciding one of the one or more candidates as the operation for generating the response based on a determination result that is determined at the determining; and generating a second response according to a decided operation;

wherein the determining comprises:

determining whether there is excess or deficiency in the information included in the first response using a result of comparison between one or more pieces of first topic information included in the first response and one or more pieces of second topic information extracted from the search query, and determining that the information included in the first response is deficient when the second topic information is not included in the first topic information, and determining that the information included in the first response is excessive when topic information different from the second topic information is included in the first topic information.

13. The information processing method according to claim 12, further comprising converting the search query into a first vector using a learning model and retrieving the one or more texts having a second vector that is similar to the first vector.

* * * * *